(12) United States Patent
Yoshikawa

(10) Patent No.: US 9,202,447 B2
(45) Date of Patent: Dec. 1, 2015

(54) PERSISTENT INSTRUMENT

(71) Applicant: Yoshinari Yoshikawa, Los Altos, CA (US)

(72) Inventor: Yoshinari Yoshikawa, Los Altos, CA (US)

(73) Assignee: Miselu, Inc., San Francisco, CA (US)

( * ) Notice: Subject to any disclaimer, the term of this patent is extended or adjusted under 35 U.S.C. 154(b) by 294 days.

(21) Appl. No.: 13/840,222

(22) Filed: Mar. 15, 2013

(65) Prior Publication Data
US 2014/0260900 A1    Sep. 18, 2014

(51) Int. Cl.
G09B 15/06 (2006.01)
G10G 7/00 (2006.01)
G09B 15/00 (2006.01)
G09B 15/08 (2006.01)

(52) U.S. Cl.
CPC *G10G 7/00* (2013.01); *G09B 15/00* (2013.01); *G09B 15/08* (2013.01)

(58) Field of Classification Search
None
See application file for complete search history.

(56) References Cited

U.S. PATENT DOCUMENTS

| 2005/0195691 A1* | 9/2005 | Arnold et al. ............ 368/82 |
| 2006/0014128 A1* | 1/2006 | Mizuno ............ 434/307 R |
| 2008/0153672 A1* | 6/2008 | Barre et al. ............ 482/4 |
| 2010/0175537 A1* | 7/2010 | Ikeya et al. ............ 84/478 |

OTHER PUBLICATIONS

Demis et al; A Software Tool for Studying Music Practice: SYMP (Study Your MUSID Pracitice); http://musicpsyc.uconn.edu/Docs/DemosESCOM%20Poster.pdf; Aug. 19, 2009.

* cited by examiner

*Primary Examiner* — Marlon Fletcher
(74) *Attorney, Agent, or Firm* — Trellis IP Law Group, PC

(57) ABSTRACT

Disclosed is a musical instrument including a persistent memory, persistent clock, a device connection interface and one or more processors configured to send a practice session alert message to remind a user that a practice session is scheduled.

20 Claims, 9 Drawing Sheets

PERSISTENT INSTRUMENT

BACKGROUND

Many musical instruments, such as pianos, guitars, drums, etc., are enjoyed by both accomplished and aspiring musicians. However, success in playing a musical instrument is dependent on efficient practice. Many musicians fail to achieve because of infrequent or inefficient practice sections.

SUMMARY

In particular embodiments, a musical instrument with including a persistent memory and persistent clock notifies a user when a practice session is scheduled.

In one embodiment, a musical instrument with capability to notify a user when a practice session is scheduled, can include: a persistent memory, a persistent clock, a user input device, a device connection interface, a controller, coupled to the persistent memory, persistent clock, the user input device and the device connection interface, with the controller configured to receive practice scheduling and practice goal information from the user input device, determine a target time value for a next practice session from received practice scheduling and practice goal information, prepare a practice session alert message, store the target time, practice scheduling and practice goal information and practice session alert message in the persistent memory, compare a current time value output by the persistent clock with the target time value and send the practices session alert message to a user if the current time is greater than or equal to the target time value.

In another embodiment, a method for one or more processors in a musical instrument to notify a user when a practice session is scheduled, can include: receiving practice scheduling and practice goal information from the user input device, determining, using the one or more processors, a target time value for a next practice session from received practice scheduling and practice goal information, preparing, using the one or more processors, a practice session alert message, storing, using the one or more processors, the target time, practice scheduling and practice goal information and practice session alert message in the persistent memory, comparing, using the one or more processors, a current time value output by the persistent clock with the target time value and sending, using the one or more processors, the practices session alert message to a user if the current time is greater than or equal to the target time value.

A further understanding of the nature and the advantages of particular embodiments disclosed herein may be realized by reference of the remaining portions of the specification and the attached drawings.

DETAILED DESCRIPTION OF EMBODIMENTS

Particular embodiments provide for a mobile musical instrument with onboard persistent memory, a processing and communication capability having features for keeping track of practice sessions and messaging practice session reminders to a user.

Figure 1:
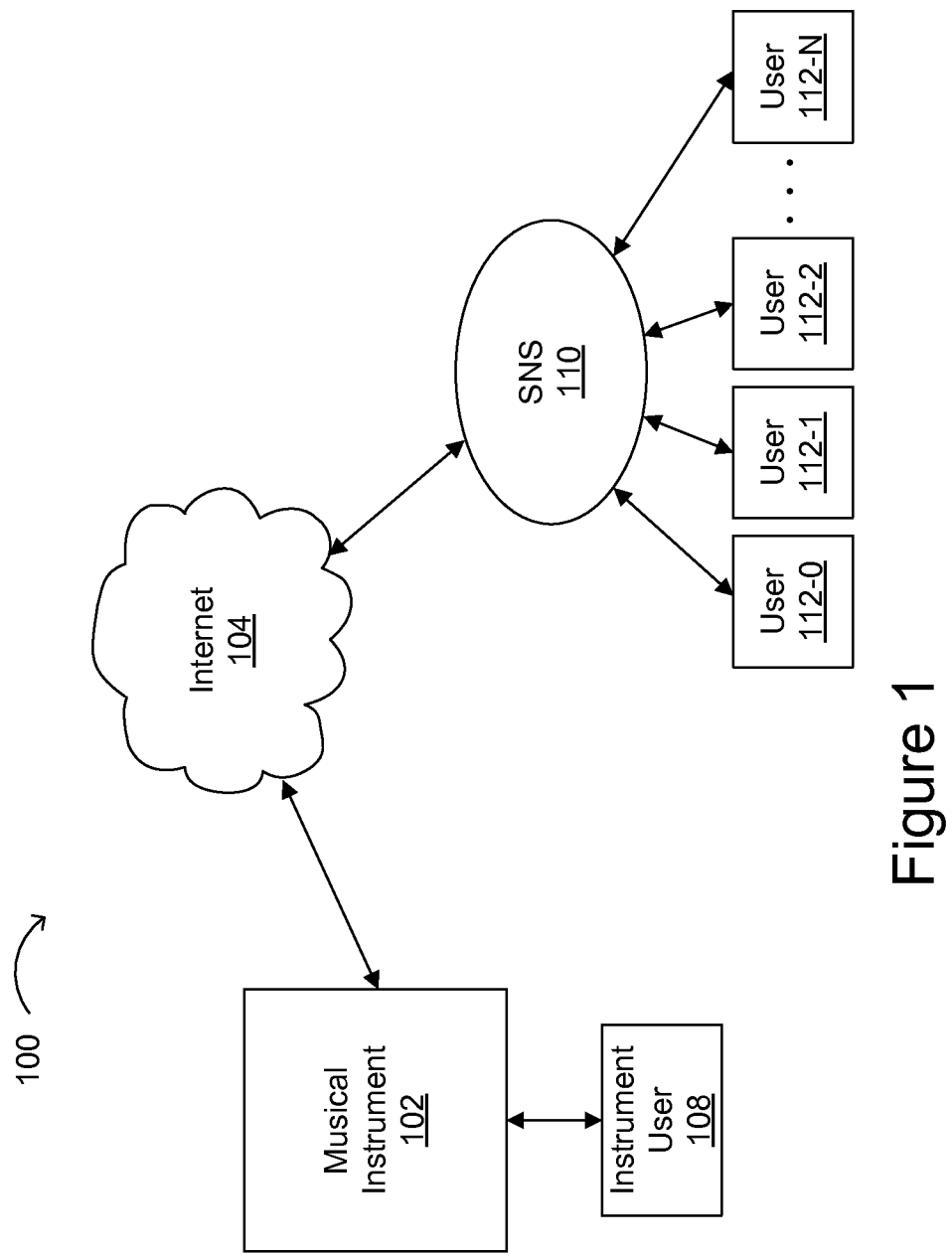
FIG. 1 depicts an example musical instrument networking arrangement.

Particular embodiments relate to a musical instrument that is able to share information, such as practice time recommendations and suggestions on practice session content created using the musical instrument, with other users via the Internet or other communication systems. For example, FIG. 1 shows one such example musical instrument networking arrangement 100 suitable for use with a practice session reminder system. Musical instrument 102 can connect to Internet 104 to allow instrument user 108 to share information with other users 112 (e.g., 112-0, 112-1, 112-2, . . . 112-N). For example, users 112 may utilize SNS 110 for sharing via Internet 104. Any suitable SNS (e.g., Facebook, twitter, YouTube, Ustream, SoundCloud, etc.), as well as any type of network (e.g., the Internet, virtual private network (VPN), etc.) can be supported in particular embodiments.

Figure 2:
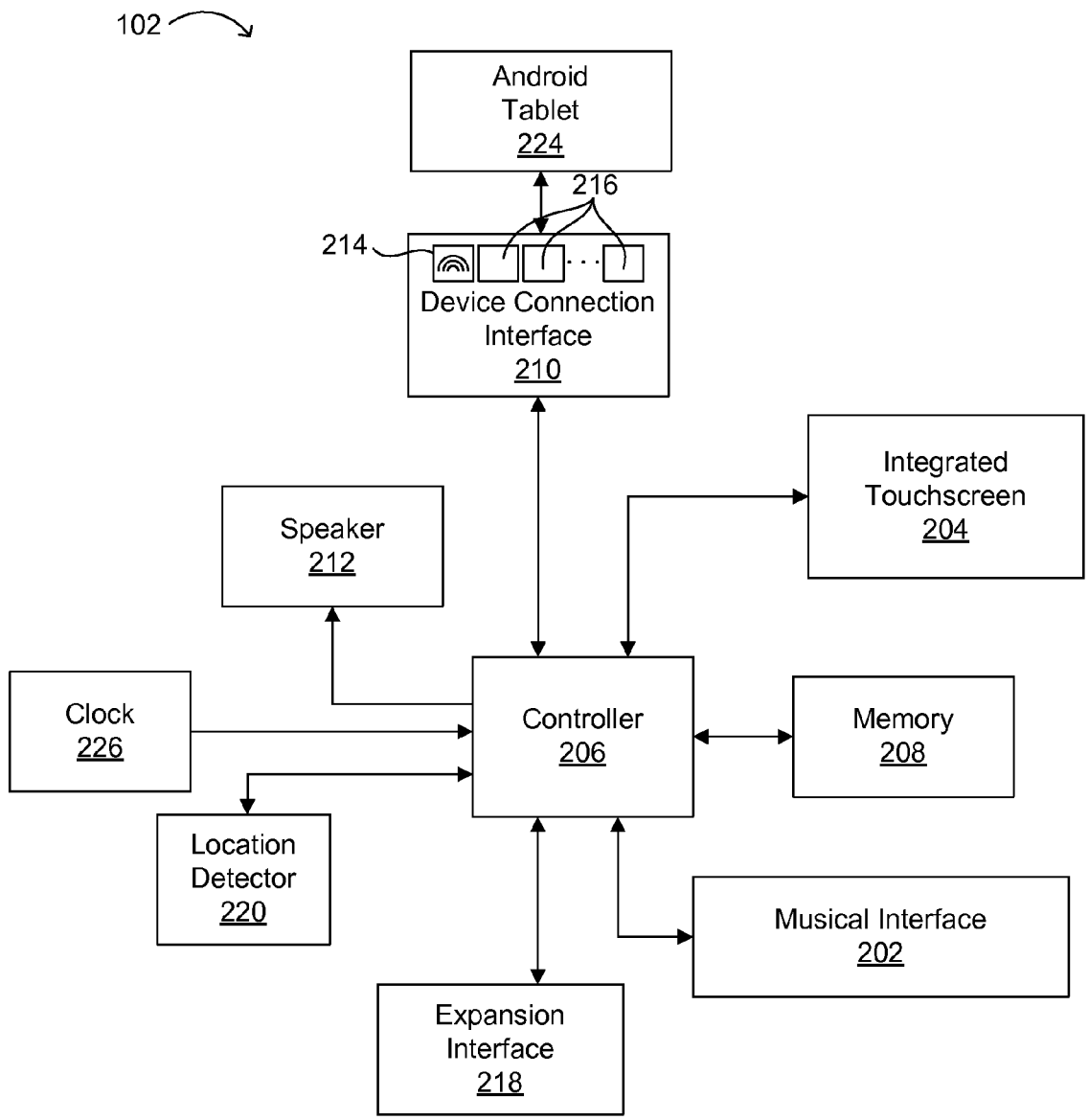
FIG. 2 depicts a functional block diagram of an example musical instrument.

Referring now to FIG. 2, shown is a functional block diagram of an example musical instrument 102 suitable for use with the practice reminder system. Musical instrument 102 can include musical interface 202 and an integrated touchscreen 204.

For example, musical interface 202 can include at least an octave of a standard piano keyboard for playing the twelve notes of the Western musical scale, with a combination of larger, longer keys and smaller, shorter keys that repeats at the interval of an octave. In a standard piano keyboard, the twelve notes of the Western musical scale are laid out with the lowest note on the left, and the longer keys (for the seven "natural" notes of the C major scale: C, D, E, F, G, A, B) jut forward. Because these keys were traditionally covered in ivory they are often called the white notes or white keys. The keys for the remaining five notes that are not part of the C major scale are typically raised and set back. Because these keys receive less wear, they are often made of black colored wood and called the black notes or black keys. The pattern repeats at the interval of an octave.

As is known in the art, musical interface 202 may include MIDI controllers emulating a guitar, wind instrument, percussion instrument etc. Other types of non-MIDI musical interfaces may also be employed.

In an example embodiment, an integrated touchscreen 204 can include any suitable interactive display surface or electronic visual display that can detect the presence and location of a touch within the display area. Touchscreen 204 may support touching the display with a finger or hand, or any suitable passive object, such as a stylus. Any suitable display technology (e.g., liquid crystal display (LCD), light emitting diode (LED), etc.) can be employed in touchscreen 204. In addition, touchscreen 204 in particular embodiments can utilize any type of touch detecting technology (e.g., resistive, surface acoustic wave (SAW) technology that uses ultrasonic waves that pass over the touchscreen panel, a capacitive touchscreen with an insulator, such as glass, coated with a transparent conductor, such as indium tin oxide (ITO), surface capacitance, mutual capacitance, self-capacitance, projected capacitive touch (PCT) technology, infrared touchscreen technology, optical imaging, dispersive signal technology, acoustic pulse recognition, etc.).

In other example embodiments, a keypad may be included to enable user input of practice session scheduling and goal information. Additionally, voice recognition techniques could also be utilized.

Controller 206 may interface with musical keyboard 202 and touchscreen 204, as well as memory 208, device connection interface 210, speaker 212, expansion interface 218, and location detector 220. In particular embodiments, controller 206 may be any suitable processor or controller (e.g., a central processing unit (CPU), a general-purpose microprocessor, a microcontroller, a microprocessor, etc.). Further, any suitable operating system (OS), or mobile OS/platform, may be utilized to manage operation of controller 206, as well as execution of various application software. Examples of operating systems include Android from Google, iPhone OS (iOS), Berkeley software distribution (BSD), Linux, Mac OS X, Microsoft Windows, and UNIX.

Memory 208 can be used for instruction and/or data memory, as well as to store music and/or video files created on or downloaded to musical instrument 102. Memory 208 can be implemented in one or more of any number of suitable types of memory (e.g., static random access memory (SRAM), dynamic RAM (DRAM), electrically erasable programmable read-only memory (EEPROM), etc.). Memory 208 can also include or be combined with removable memory, such as memory sticks (e.g., using flash memory), storage discs (e.g., compact discs, digital video discs (DVDs), Blu-ray discs, etc.), and the like. Interfaces to memory 208 for such removable memory can include a universal serial bus (USB), and may be implemented through a separate connection and/or via device connection interface 210. In this example embodiment, the memory 208 includes persistent memory that stores data when the device is OFF or not powered.

Device connection interface 210 can be used to connect other devices and/or instruments to musical instrument 102. For example, connection interface 214 can be used for wireless connectivity (e.g., Wi-Fi, Bluetooth, etc.) to Internet 104 (e.g., navigable via touchscreen 204), or to another device. Connection interfaces 216 can represent various types of connection ports to accommodate corresponding devices or types of connections. For example, additional speakers (e.g., Jawbone wireless speakers, or directly connected speakers) can be added via device connection interface 210. Also, headphones via the headphone jack (e.g., in connection interfaces 216) can also be added directly, or via wireless interface. Connection interfaces 216 can also include a USB interface to connect with any USB-based device.

Device connection interface 210 can also allow for connection of musical instrument 102 with any number of other instruments (e.g., guitar, drums, etc.), either directly or via Internet 104. In some cases, musical keyboard 202 can effectively be replaced by other instruments connected via device connection interface 210, while in other cases such additionally connected instruments may supplement (e.g., to form a band) musical keyboard 202. Thus, various instruments (e.g., a turntable for disc jockeying, drums, piano, etc.) may be coupled together to provide music over a common stream, such as directly via controller 206 and/or via Internet 104.

In another example embodiment, an integrated touchscreen 204 is not included. Instead, a stand-alone Android tablet 224 is connected to the instrument 102 using the device connection interface 210. In this embodiment, the control functions may be completely performed by the controller of the Android tablet and or may be shared by the controller 206 of the musical device and the Android tablet controller.

The Android tablet 224 is shown by way of example, not limitation, an may be replaced by other tablet devices such as the iPAD® and so on and software would use libraries appropriate for the operating system used by tablet computer.

Speaker 212 can be an integrated speaker between musical keyboard 202 and touchscreen 204 of musical instrument 102. Speaker 212 can be used to play sounds from applications (e.g., movies, music video, piano training applications, etc.) from touchscreen 204 and/or sounds from musical keyboard 202. Speaker 212 can also be supplemented with additional external speakers connected via device connection interface 210, or multiplexed with such external speakers or headphones.

The expansion interface 218 may indicate to controller 206 whether musical keyboard 202 is a standard or expanded version such that the additional keys in an expanded version, as well as additional touchscreen 204 width, can be accommodated. In one application, each touchscreen 204 in an expanded musical instrument can be used to show a different function (e.g., one a music video or movie, and another text corresponding to the movie, a text messaging window, etc.), or the touchscreens can be effectively meshed together to appear as a wider screen (e.g., portions of a music video or movie playing on different screens to form a full movie view).

Location detector 220 can be used to detect the location of musical instrument 102. Any suitable geographic location "geolocation" determination mechanism (e.g., global positioning system (GPS), Internet and computer geolocation, etc.) can be used to determine a location of musical instrument 102. In particular embodiments, "geotagging" or other appropriate tagging, can be used to add geographical identification metadata to various media (e.g., photographs, audio, video, websites, short message service (SMS) messages, really simple syndication (RSS) feeds, etc.) emanating from (or downloaded to) musical instrument 102. For example, such geographic metadata can include any geospatial metadata (e.g., latitude and longitude coordinates, altitude, bearing, distance, accuracy data, place names, etc.), may further be associated with an Internet protocol (IP) address, media access control (MAC) address, radio-frequency identification (RFID), hardware embedded article/production number, embedded software number, Wi-Fi connection location, etc., in addition to the tagged media (e.g., a music video). In this fashion, music and/or video made by music instrument 102 can be "stamped" as coming from the particular device at the location at which the music and/or video was made by determining the location of music instrument 102.

A persistent clock 226 keeps track of time when the musical device is in the OFF of SLEEP state.

In one particular example, a musical instrument with networking capability includes: a musical keyboard having a plurality of first keys and a plurality of second keys in a pattern that is repeatable at an octave, where the first keys are shorter and raised relative to the second keys; a touchscreen attached to the musical keyboard, where the touchscreen is movable between a flattened position and a collapsed position that is over the musical keyboard; a device connection interface configured to support a plurality of external connections; and a controller coupled to the musical keyboard, the touchscreen, and the device connection interface.

Figure 3:
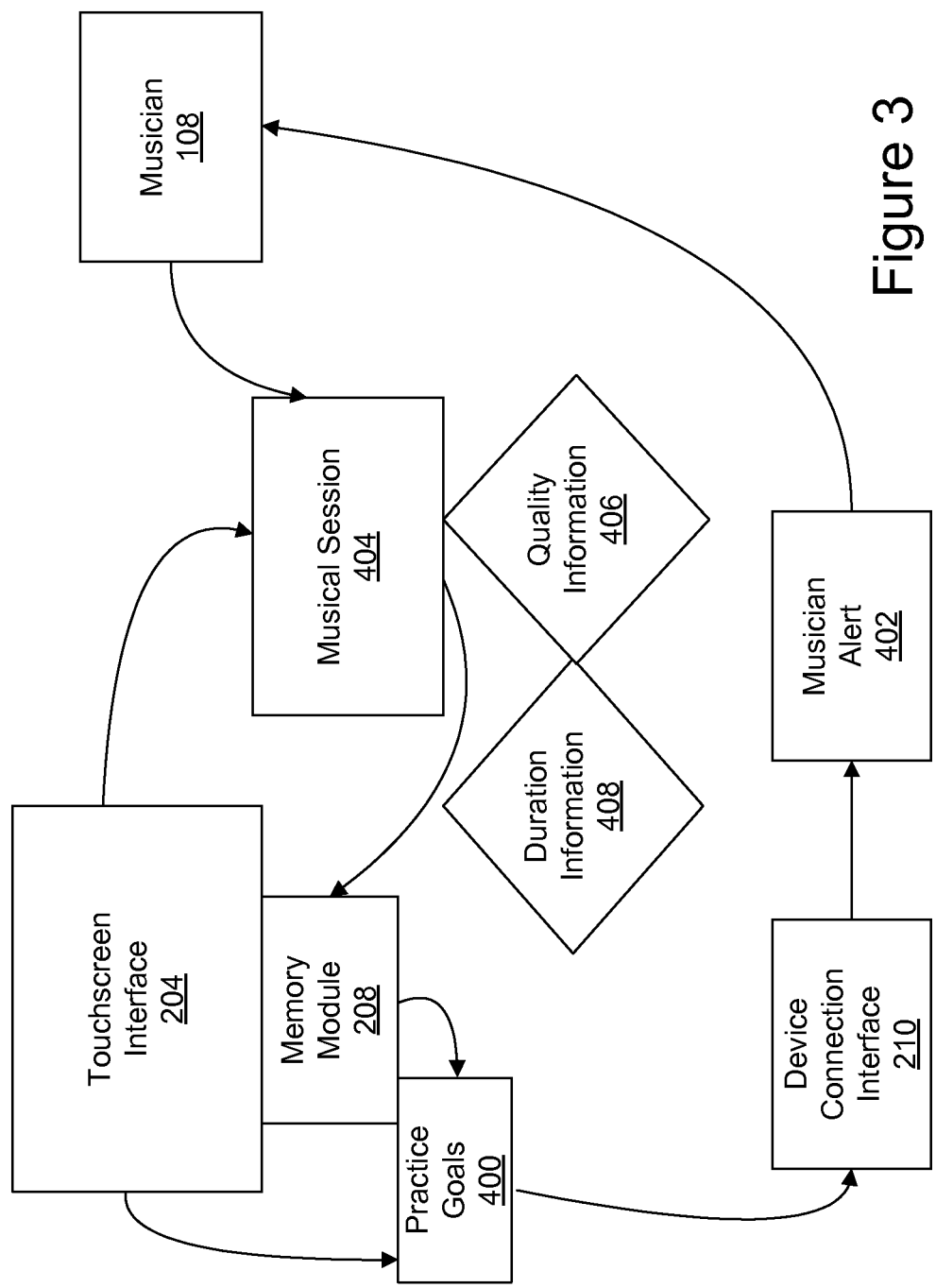
FIG. 3 illustrates a method technique for notifying a user that a practice session is scheduled.
Figure 4:
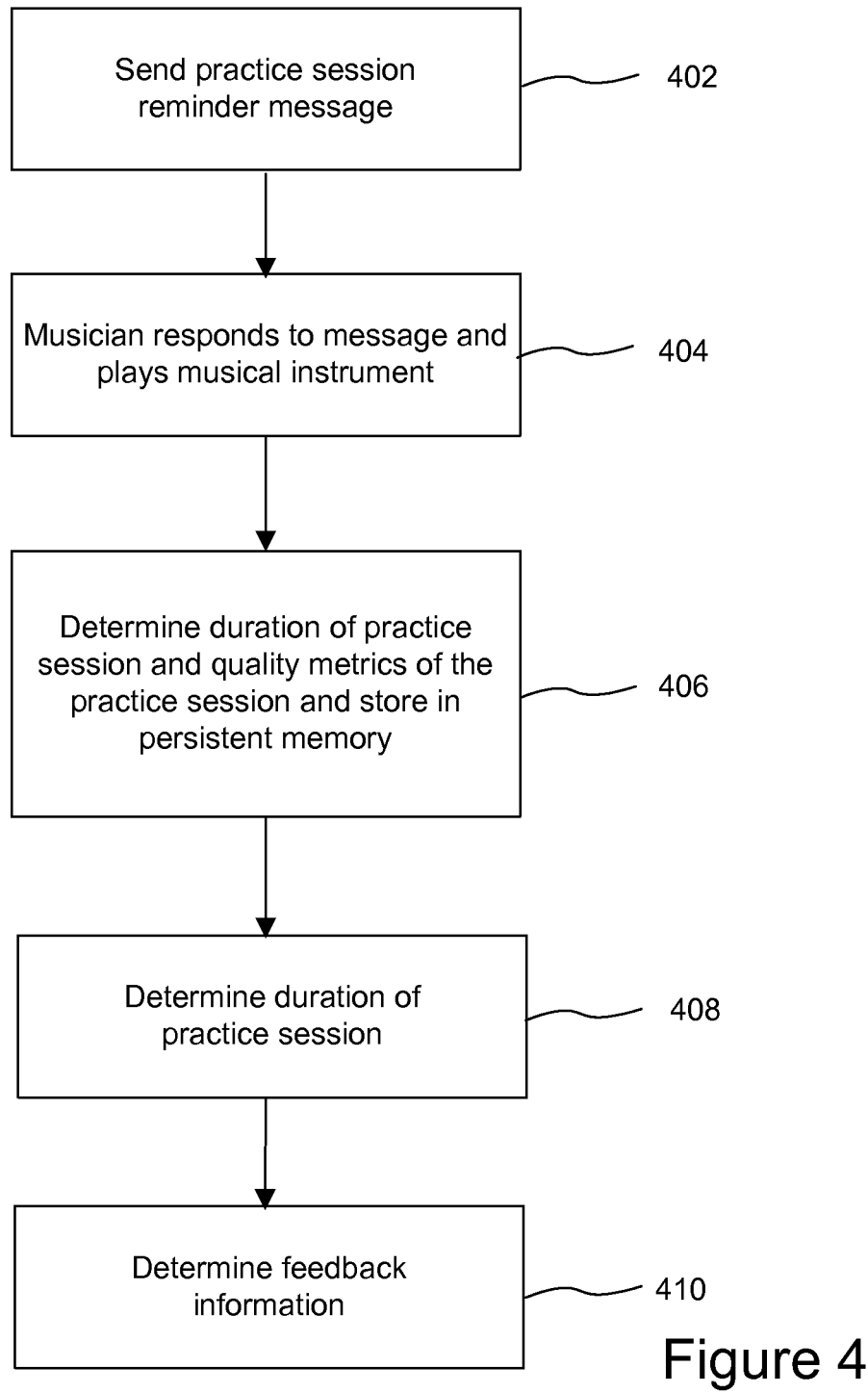
FIG. 4 is flow chart depicting an example of a method for generating feedback to included in a practice session reminder message.

FIG. 3 is a high-level schematic flow diagram of an example embodiment and FIG. 4 is a flow chart illustrating the operation of the example embodiment. Components shown in FIG. 3 are assigned the same reference numerals as like or similar components depicted in FIG. 2.

Referring to FIGS. 3 and 4, in process step 400 an instructor or the musician enters practice goals, such a practice time, practice frequency, practice session duration, quality metrics etc. using the touchscreen interface and the practice goals are stored in the persistent memory.

In process step 402 a practice reminder alert is sent to the musician notifying the musician that a practice session has been scheduled. In this example, the musical instrument may be OFF or in SLEEP mode. The controller monitors the time output by the persistent clock 226 and wakes up the musical device when a practice session is scheduled. The controller then creates a practice reminder alert and transmits the alert to musician. The practice reminder alert includes feedback comparing the duration and quality of previous practice session with the duration and quality goals stored in the persistent memory. A more detailed description of the process of sending the practice session alert message is described below.

In process step 404 the musician responds to the practice reminder alert and plays the musical device.

In process step 406, while a musical session is ongoing, the controller analyzes the quality of the musician's performance and stores metrics characterizing quality of the musical performance in the persistent memory 208.

In process step 408, the controller compares the start time and the finish time of the musical session to determine the duration of the musical session and stores the duration in the persistent memory.

In process step 410, the processor processes stored goal practice duration and goal practice quality metrics to the duration and quality metrics of the practice session to calculate feedback information.

Figure 5:
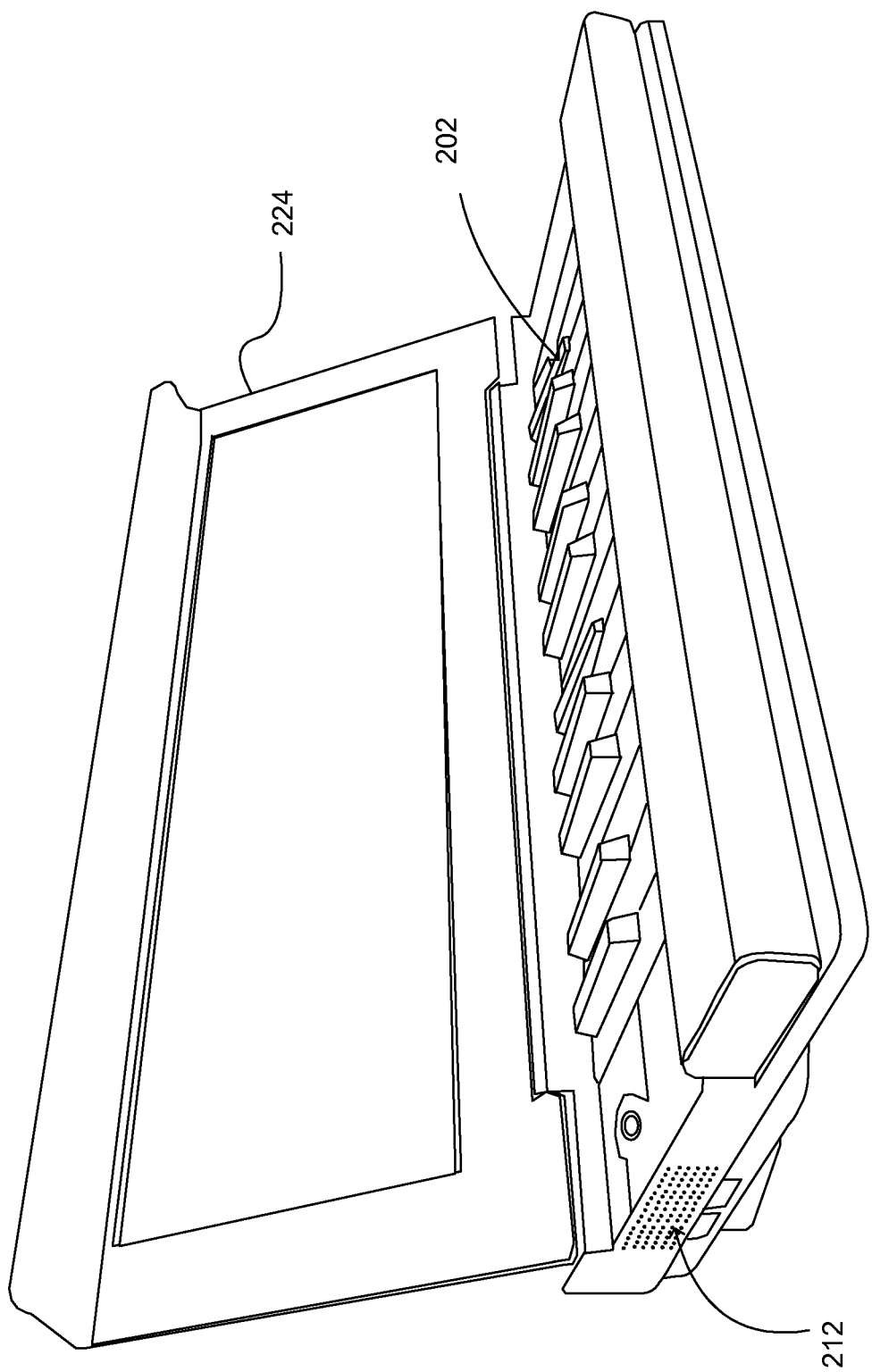
FIGS. 5 and 6 illustrate example musical instrument arrangements.

FIG. 5 depicts an example embodiment in the form of a keyboard instrument utilizing an Android tablet 224 connected as an interface to the musical instrument 104. As described above, the Android tablet is connected to the musical instrument using the device connection interface 210 and the connection can be a physical connection or a wireless connection. In this example, software for executing the practice session reminder system is implemented in software and utilizes libraries of the Android operating system.

Figure 6:
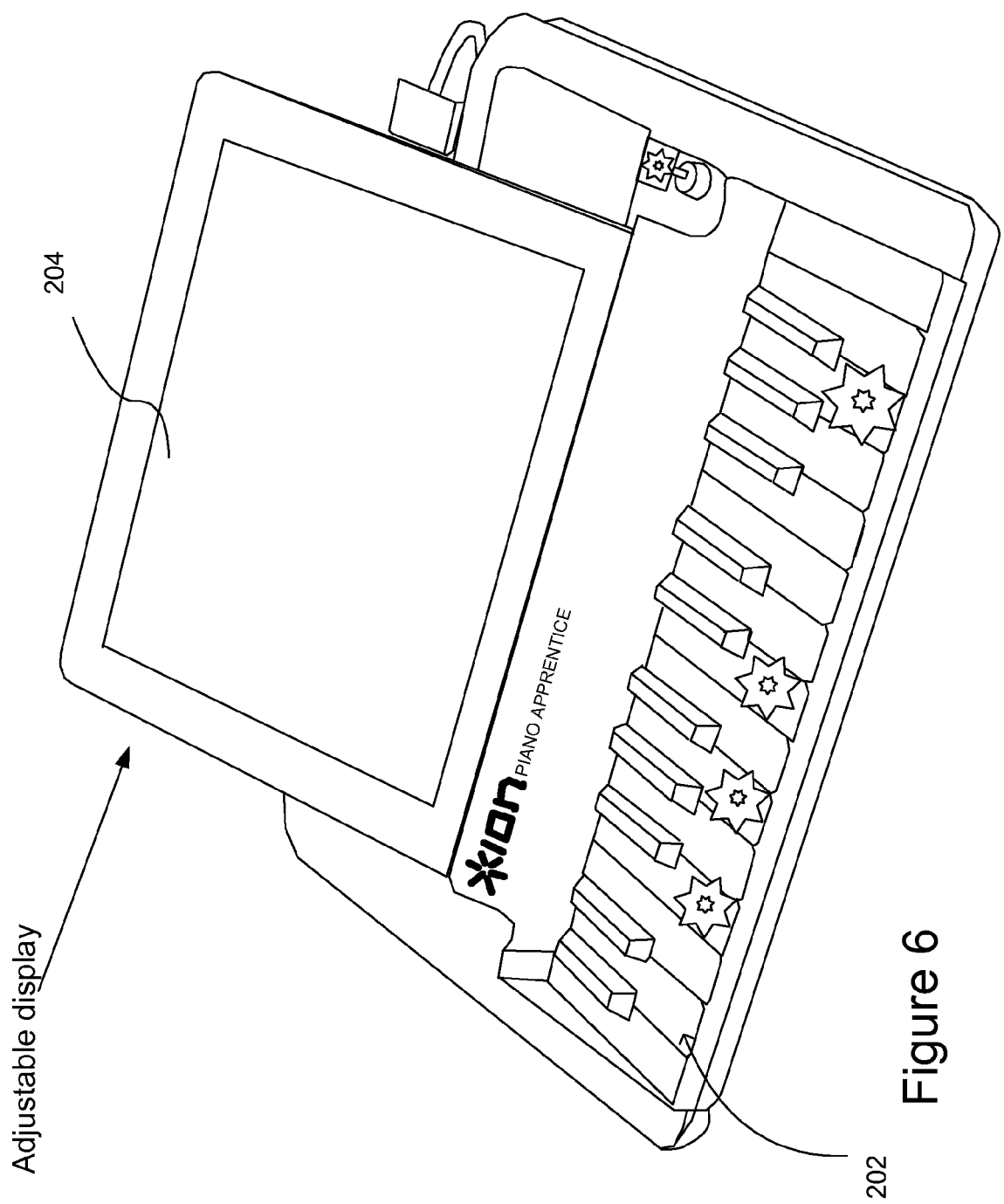

FIG. 6 depicts an example embodiment in the form of a keyboard instrument having a built in touchscreen.

As describe above, during a practice session the practice session reminder evaluates certain quality metrics of the practice session performance and stores the metrics in the persistent memory. In an example embodiment, the performance quality metrics include the complexity of the performance, the accuracy of the performance, the consistency of the performance, the precision of the performance, the tempo of the performance, overall quality of the performance. Additionally, the duration of the performance and list of pieces performed are also stored in the persistent memory.

Various techniques for measuring these metrics are known in the art and only a few examples will be described herein. For example, precision can be a measure of when a note of piece is played compared to a reference of a high quality performance of the piece and accuracy can be a measure of the note played during a practice session compared to the note called out by the score of the piece. Overall quality can be calculated as a weighted average of the different metrics.

Figure 7:
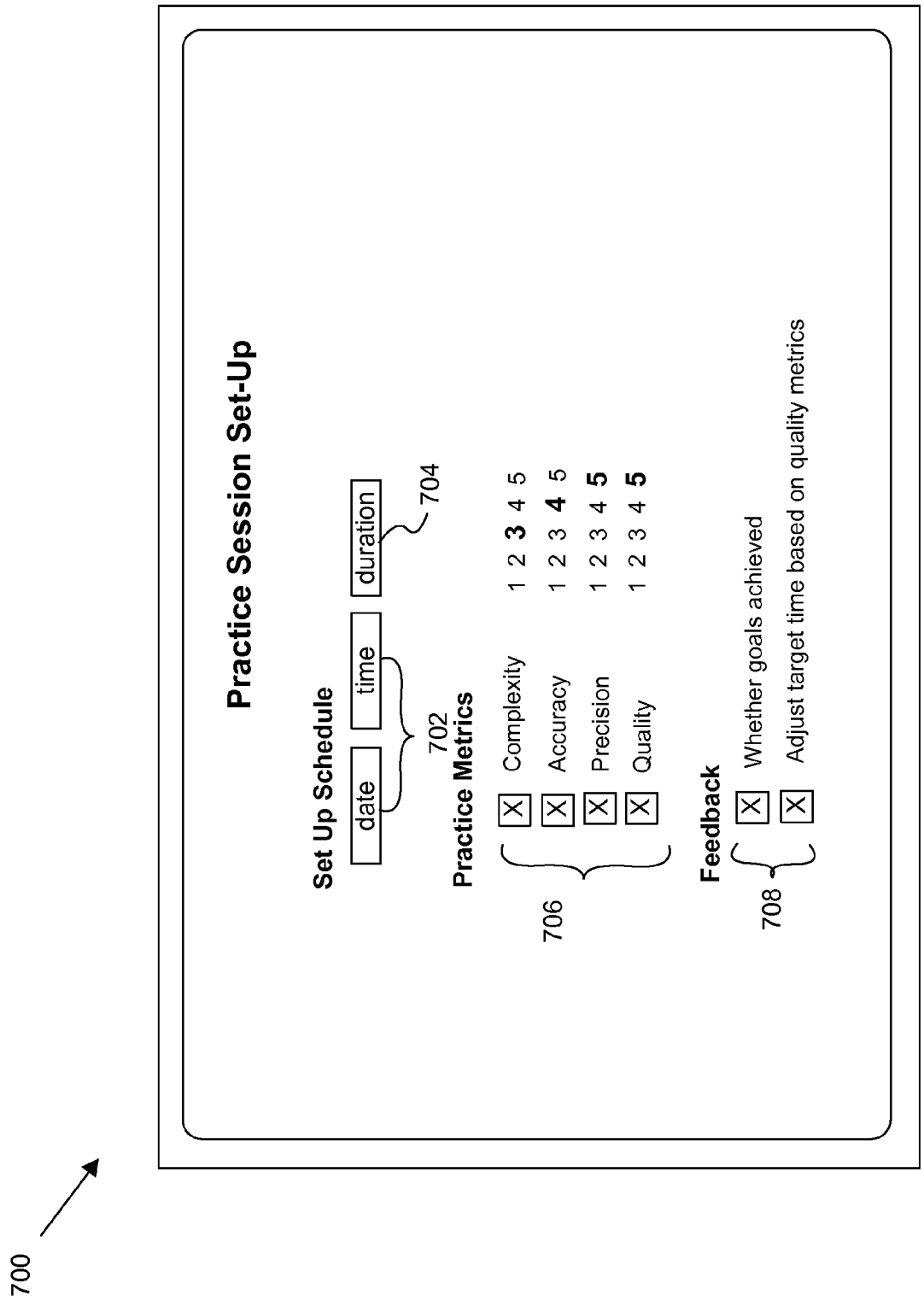
FIG. 7 is a screen shot illustrating of an example method of a user interface for configuring a practice session reminder system.

FIG. 7 is schematic diagram of an example user interface 700 for entering a practice session plan including practice section goals. A scheduling field 702 is used to enter a specific time for daily practice, a practice schedule on selected days of the week or a delay threshold that triggers a practice alert when the threshold expires. A duration field 704 allows the entry of a fixed time period or the requirement that practice continue until a specific metric is reached. A metric entry table 706 allows the entry of metric values to be reached during a practice session. A feedback entry table 708 allows selection of feedback information to be provided in a practice session reminder message. Examples of feedback information include feedback on whether target goals are achieved and feedback on adjustment of target times based on performance quality metrics.

In an example embodiment, the goal metrics and metrics achieved during a practice session can be processed to determine a target time for a next practice session. For example, if the achieved metric values are much lower than the goal metric values then a target time will be scheduled sooner than in the case where the achieved metric values exceed the goal metric values.

Figure 8:
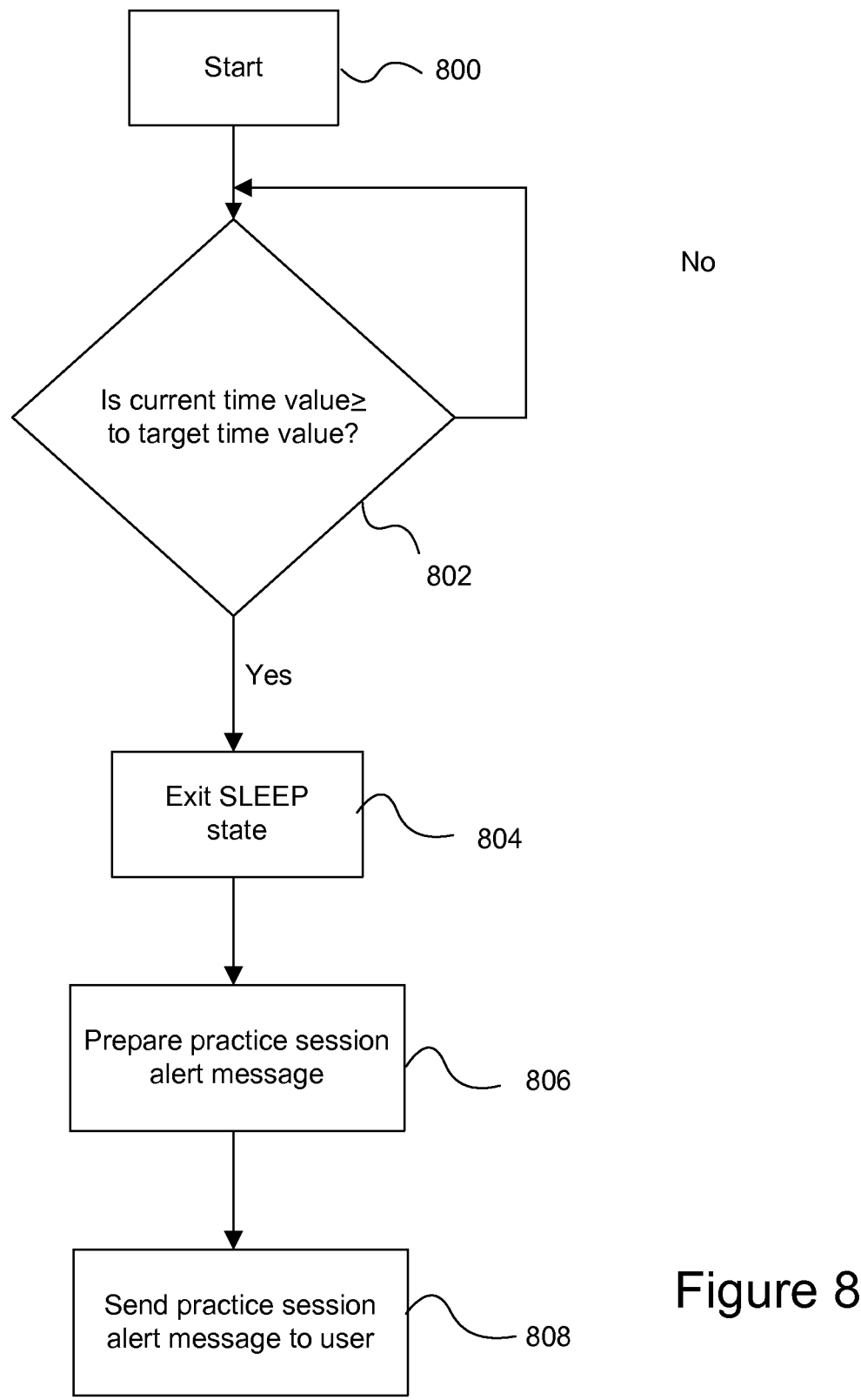
FIG. 8 is flow chart depicting an example of a method for sending a practice session reminder message.

FIG. 8 is a flow chart depicting the process of preparing and sending a practice session reminder message in an example embodiment. In this example is it assumed that the musical instrument is in the SLEEP state to conserve power.

In process starts at process step 800 and in process step 802 the current time value output by the persistent clock is compared to a target time value of the next practice session by the processor to determine whether the current time value is greater than or equal to the current time value. If yes, then the process continues to process step 804 and if NO the process loops.

In process step 804 the instrument is activated by the processor to terminate the SLEEP state.

In process step 806 a practice session alert message is prepared by the processor and the musical instrument is connected to a network.

In process step 808 the practice session alert message is sent to the user by the processor.

In an another example embodiment, the practice session reminder message is prepared and stored in memory.

A first practice session reminder message is created using the goal information provided by the instructor or musician. Subsequent session reminder messages include feedback information based on information saved during a practice session including metric values of a performance during the practice session.

Figure 9:
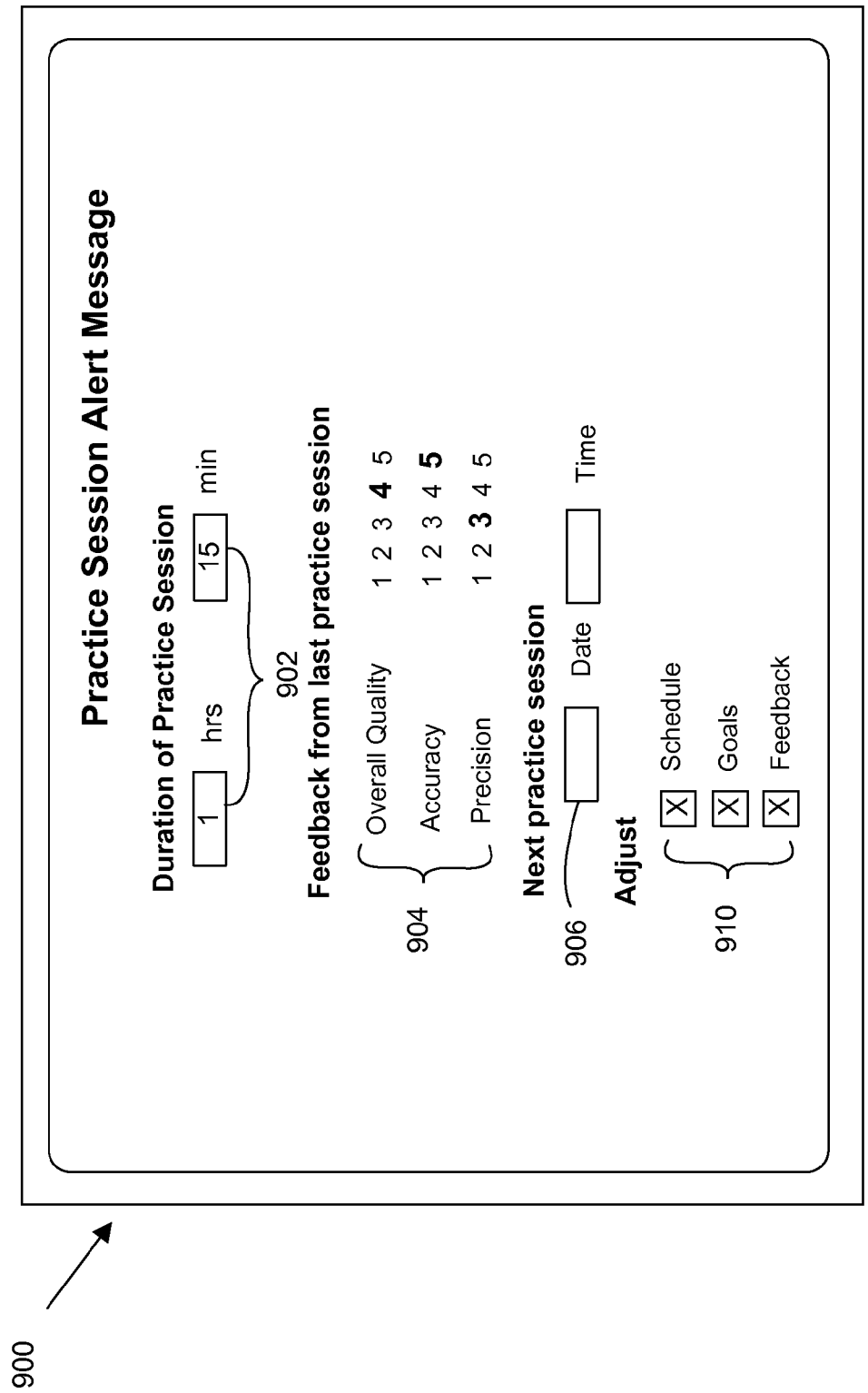
FIG. 9 is a screen shot illustrating of an example practice session reminder message.

FIG. 9 is a schematic diagram depicting the format of an example practice session reminder message 900. A duration table 904 depicts the duration of the scheduled practice session. A quality goals section lists the quality metric values that set the goals for the current practice session. An adjust table 910 allows the user to select aspects of the next practice session to adjust.

Musical instrument 102 can also include modules to allow for cellular (e.g., a 3G module) or Internet (e.g., a Skype module) based calling. Touchscreen 204 can thus be utilized for applications, videos, teaching tools, videoconferences, video phone calls, and so on. In addition, camera 514 can be used for still photographs, as well as running video, or video constrained while using musical keyboard 202.

Although the description has been described with respect to particular embodiments thereof, these particular embodiments are merely illustrative, and not restrictive. For example, while certain keys in the musical keyboard have been shown, any suitable key or instrument arrangement can be accommodated in particular embodiments. Further, while certain connections and applications have been discussed herein, any suitable connections and applications can be accommodated in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A musical instrument comprising:
a persistent memory;
a persistent clock,
a user input device;
a device connection interface;
a controller, coupled to the persistent memory, persistent clock, user input device and device connection interface, with the controller configured to:
receive practice scheduling information, where practice scheduling information includes scheduled times for beginning practice sessions;
receive practice goal information including a target quality metric value for a selected performance characteristic;
compare an achieved performance quality metric value, achieved during a practice session on the musical instrument, to the target quality metric value for the selected performance characteristic;
adjust the scheduled time for beginning the next practice session to occur sooner if the achieved performance quality metric value is less than the target quality metric value for the selected performance characteristic;
prepare a practice session alert message;
store an adjusted scheduled time for beginning the next practice session, practice goal information and a practice session alert message in the persistent memory;
compare a current time value output by the persistent clock with the adjusted scheduled time for beginning the next practice session; and
send the practices session alert message to a user if the current time is greater than or equal to the adjusted scheduled time for beginning the next practice session.

2. The musical instrument of claim 1 where one or more quality metric values include quality metric values regarding complexity of performance, accuracy of performance, consistency of performance, precision of performance and tempo of performance.

3. The musical instrument of claim 1 where practice goal information includes target quality metric values to be achieved during a practice session, with the controller further configured to perform the steps of:
storing one or more quality metric values achieved during a practice session in the persistent memory;
comparing, using the processor, one or more achieved quality metric values to the one or more target quality metrics;
determining, using the processor, feedback information based on the comparison of the one or more achieved quality metric values to the one or more target quality metrics.

4. The musical instrument of claim 3 with one or more processors further configured to perform the step of:
including the feedback information in the practice session reminder message.

5. The musical instrument of claim 3 where one or more quality metric values include quality metric values regarding complexity of performance, accuracy of performance, consistency of performance, precision of performance and tempo of performance.

6. The musical instrument of claim 1 where the user input device comprises:
an integrated touchscreen.

7. The musical instrument of claim 1 where the user input device comprises:
an Android tablet device; and where the processor is further configured to execute Android library program code.

8. The musical instrument of claim 1 wherein the device connection interface is configured to provide a connection to the Internet that is navigable via the touchscreen.

9. The musical instrument of claim 1, wherein the device connection interface comprises a headphone jack, a universal serial bus (USB) port, and a wireless network connection.

10. The musical instrument of claim 1, further comprising:
a location detector configured to determine a geographic location of the musical instrument.

11. A method, performed by one or more processors included in or coupled to a musical instrument having a persistent memory, a persistent clock, a user input device and a device connection interface, for alerting a user when a practice session is scheduled, the method comprising:
receiving practice scheduling information, where practice scheduling information includes scheduled times for beginning practice sessions;
receiving practice goal information including a target quality metric value for a selected performance characteristic;
comparing, using the one or more processors, an achieved performance quality metric value, achieved during a practice session on the musical instrument, to the target quality metric value for the selected performance characteristic;
adjusting, using the one or more processors, the scheduled time for beginning the next practice session to occur sooner if the achieved performance quality metric value is less than the target quality metric value for the selected performance characteristic;
preparing, using the one or more processors, a practice session alert message;
storing, using the one or more processors, an adjusted scheduled time for beginning the next practice session, practice goal, information and practice session alert message in the persistent memory;
comparing, using the one or more processors, a current time value output by the persistent clock with the adjusted scheduled time for beginning the next practice session; and
sending, using the one or more processors, the practices session alert message to a user if the current time is greater than or equal to the adjusted scheduled time for beginning the next practice session.

12. The method of claim 11 where one or more quality metric values include quality metric values regarding complexity of performance, accuracy of performance, consistency of performance, precision of performance and tempo of performance.

13. The method of claim 11 where practice goal information includes target quality metric values to be achieved during a practice session, with the method further comprising:
storing one or more quality metric values achieved during a practice session in the persistent memory;
comparing, using the processor, one or more achieved quality metric values to the one or more target quality metrics;
determining, using the processor, feedback information based on the comparison of the one or more achieved quality metric values to the one or more target quality metrics.

14. The method of claim 13 further comprising:
including the feedback information in the practice session reminder message.

15. The method of claim 13 where one or more quality metric values include quality metric values regarding complexity of performance, accuracy of performance, consistency of performance, precision of performance and tempo of performance.

16. A musical instrument for alerting a user that a practice session is scheduled, the apparatus comprising:
a persistent memory;
a persistent clock,
a user input device;
a device connection interface;
logic encoded in one or more tangible media for execution by the one or more processors, and when executed performing the steps of:
receiving practice scheduling information, where practice scheduling information includes scheduled times for beginning practice sessions;
receiving practice goal information including a target quality metric value for a selected performance characteristic;
comparing an achieved performance quality metric value, achieved during a practice session on the musical instrument, to the target quality metric value for the selected performance characteristic;
adjusting the scheduled time for beginning the next practice session to occur sooner if the achieved performance quality metric value is less than the target quality metric value for a selected performance characteristic;
preparing a practice session alert message;
storing an adjusted scheduled time for beginning the next practice session, practice goal information and a practice session alert message in the persistent memory;
comparing a current time value output by the persistent clock with the adjusted scheduled time for beginning the next practice session; and
sending the practices session alert message to a user if the current time is greater than or equal to the adjusted scheduled time for beginning the next practice session.

17. The musical instrument method of claim 16 where one or more quality metric values include quality metric values regarding complexity of performance, accuracy of performance, consistency of performance, precision of performance and tempo of performance.

18. The musical instrument of claim 16 where practice goal information includes target quality metric values to be achieved during a practice session, with the logic when executed further performing the steps of:
storing one or more quality metric values achieved during a practice session in the persistent memory;
comparing, using the processor, one or more achieved quality metric values to the one or more target quality metrics;
determining, using the processor, feedback information based on the comparison of the one or more achieved quality metric values to the one or more target quality metrics.

19. The musical instruments of claim 18 with the logic when executed further able to perform:
including the feedback information in the practice session reminder message.

20. The musical instruments of claim 18 where one or more quality metric values include quality metric values regarding complexity of performance, accuracy of performance, consistency of performance, precision of performance and tempo of performance.

\* \* \* \* \*